United States Patent [19]

Swanson

[11] Patent Number: 4,896,954
[45] Date of Patent: Jan. 30, 1990

[54] REARVIEW MIRROR

[76] Inventor: Arthur P. Swanson, 1454 Estate La., Glenview, Ill. 60025

[21] Appl. No.: 356,710

[22] Filed: May 25, 1989

[51] Int. Cl.$^4$ ............................................. G02B 5/08
[52] U.S. Cl. .................................... 350/632; 248/467
[58] Field of Search ............. 350/604, 605, 632, 633, 350/634, 636, 639; 248/467, 477, 478, 481, 485, 487, 548

[56] References Cited

U.S. PATENT DOCUMENTS

| | | | |
|---|---|---|---|
| 2,091,203 | 8/1937 | Hay | 248/481 |
| 2,895,380 | 7/1959 | Kurlytis | 350/639 |
| 2,995,983 | 8/1961 | Davis | 248/467 |
| 3,542,456 | 11/1970 | Huge | 248/467 |

Primary Examiner—Bruce Y. Arnold
Assistant Examiner—Jay Ryan

[57] ABSTRACT

Rear view mirrors for modern aerodynamic streamlined automobiles are mounted on the sides of the vehicle body as close to the front end as possible without interfering with components of the vehicle to extend above and laterally outward from the hood to reflect approaching vehicles on both sides of the automobile and provide clear vision to the driver as the vehicles approach and pass the rear end of the automobile. The positioning of the mirrors forwardly from the driver's eyes at the greatest distance permitted by the vehicle without forming an obstacle reduces the angle of incidence and the angle of reflection to a minimum thereby avoiding heretofore encountered blind spots in the driver's rear view vision. The mirror mounting can be streamlined into the front sides of the vehicle body in original equipment vehicles or can be provided as an accessory. The added accessory mountings include a streamlined cup-like base carrying initial temporary attachments such as suction cups or magnets and have a deformable gasket around the periphery thereof to be pressed tightly against and follow the contour of the vehicle's side wall.

10 Claims, 3 Drawing Sheets

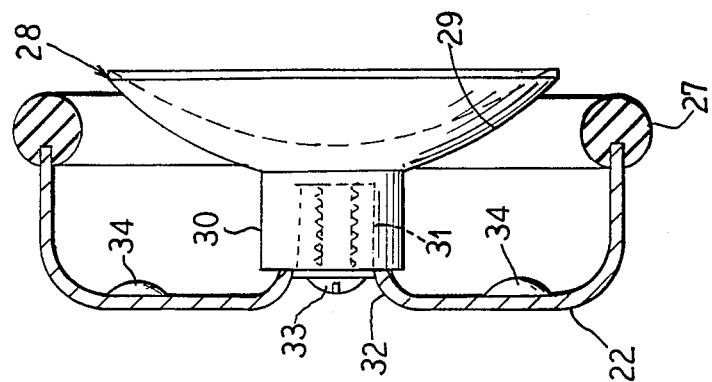
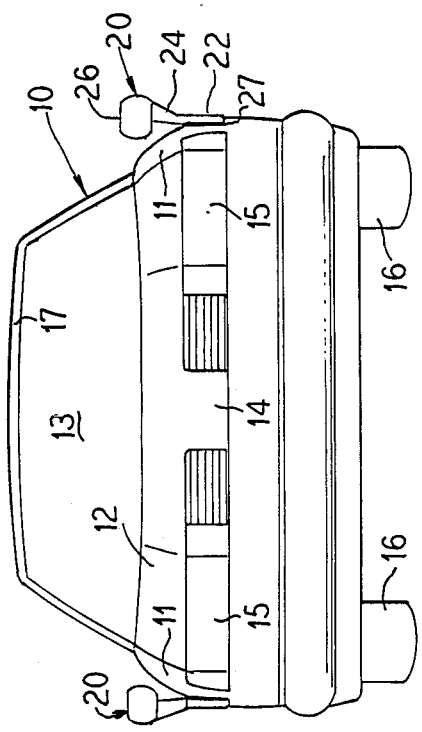
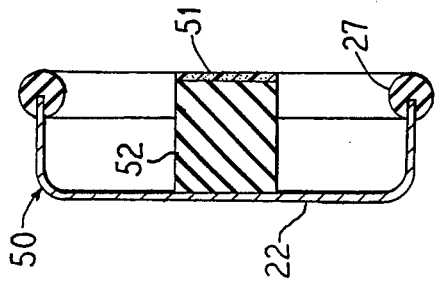
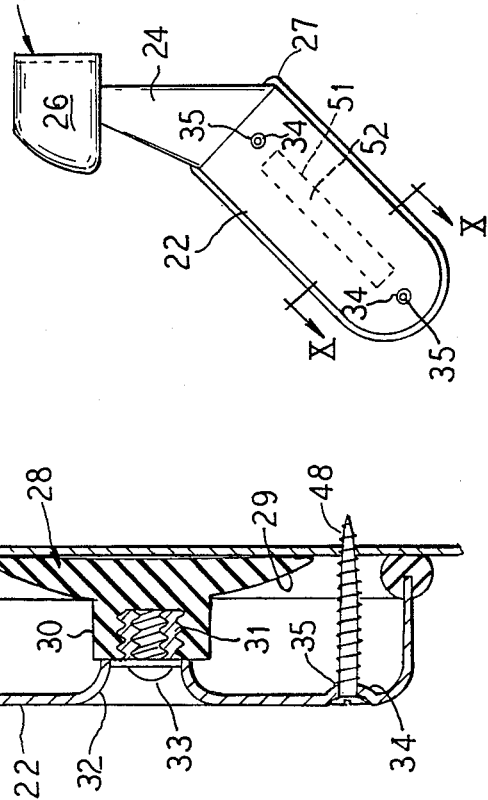
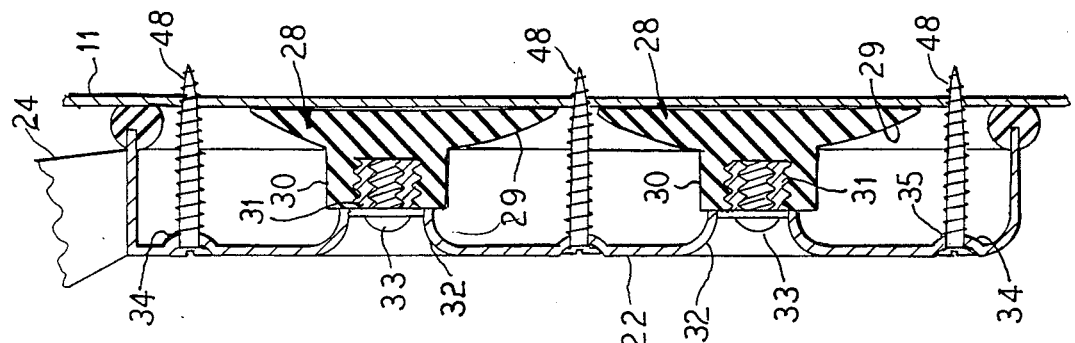

REARVIEW MIRROR

BACKGROUND OF THE INVENTION

1. Field of the Invention

This invention relates to rear view mirrors for vehicles and especially deals with rear view mirror mountings for the front end sides of an aerodynamically streamlined automobile to provide maximum rear view vision to the driver without the heretofore encountered blind spots.

2. Description of the Prior Art

Conventional automobile rear view mirrors are mounted on the sides of the automobile close to the windshield. The short distance between the eyes of the driver and these side mounted mirrors provides a very wide angle of incidence and a corresponding wide angle of reflection which creates blind spots in the driver's rear view zone. An especially troublesome blind spot occurs when a vehicle in the lane next to the driver's side approaches and passes the rear end of the automobile. In the conventional rear view mirrors, this vehicle is not visible to the driver until it is almost up to the driver's seat.

It would therefore be an improvement in this art to provide rear view mirrors for aerodynamically streamlined automotive vehicles which are mounted on the front end sides of the vehicle to provide a small angle of incidence between the driver's eyes and the mirror.

It would be a further improvement in this art to provide accessory rear view mirror kits for streamlined vehicles which are initially mounted on the sides of the vehicle by suction cups or magnets for trial and error positioning of the mirror to provide the lowest possible angle of incidence from the driver's seat and to then permanently mount the mirrors in the optimum positions on the sides of the vehicle.

SUMMARY OF THE INVENTION

According to this invention there is provided a vehicle rear view mirror mounting which has a very low angle of incidence between the driver's eyes and the mirror and a corresponding low angle of reflection to give unobstructed rear view vision areas, on both sides of the vehicle. The angle of incidence is reduced by providing the greatest possible distance between the driver's eyes and the mirrors without interfering with any components of the vehicle. Modern aerodynamically streamlined automobiles do not have laterally projected fenders which provide a surface for mounting rear view mirrors. The hoods of these streamlined vehicles slope downwardly from the windshield and the sides of the vehicles have rounded front ends reducing the width of the front of the vehicle to cut down wind resistance. These vehicles also have built in wrap around lights including front headlights, front and side parking lights, side corner lights and side signal lights. Rear view mirrors mounted at the front ends of such vehicles have to be spaced laterally outward from the hood and have to project above the low front end of the vehicle to be visible to the driver. This invention provides such rear view mirrors for such vehicles.

The mirror mountings of this invention may be contoured into the curved sides of the vehicle when supplied as original equipment or may be provided as an accessory for the vehicles. The accessory mountings have cup-like bases, upstanding tubular necks, and rearwardly opening cup-like mirror frames tiltably supporting the mirror for adjustment. The cup-like base mounts temporary attachment means such as suction cups or magnets for trial and error positioning of the mounting on the side of the vehicle at the best available location without interfering with the vehicle lights or the opening of the hood. These temporary supports will hold the frame in position until the desired location is found without in any way scratching the sides of the vehicle. Holes in the base receive a drill for piercing the side wall of the vehicle and for receiving self-tapping screws, bolts, or the like to permanently mount the framework.

The accessory mountings are supplied for both sides of the vehicle.

Preferred embodiments of the rear view mirrors of this invention are illustrated in the attached drawings in which:

FIG. 2 is a front end elevational view of the automobile of FIG. 1 showing the spacing of the mirror housings laterally outward and above the front ends of the side walls of the vehicle.

FIG. 7 is a longitudinal sectional view along the line VII—VII of FIG. 6.

FIG. 8 is a transverse sectional view along the line VIII—VIII of FIG. 6.

FIG. 9 is an outside face elevational view of a modified rear view mirror of this invention.

FIG. 10 is a transverse sectional view along the line X—X of FIG. 9.

As shown on the drawings:

Figure 1:
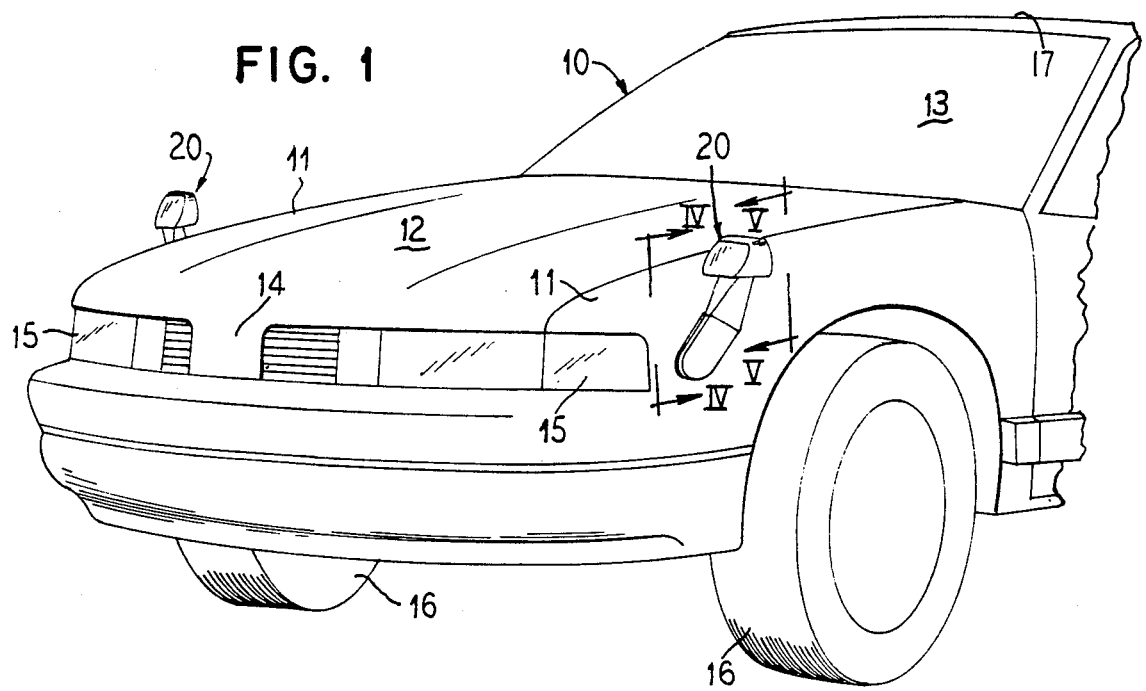
FIG. 1 is a front and side perspective view of an aerodynamically streamlined automobile equipped with rear view mirrors of this invention.

The automobile 10 of FIGS. I–III is aerodynamically streamlined with upstanding side walls 11,11 curved at their tops to merge with the hood or bonnet 12 forwardly of the rearwardly sloping windshield 13 and sloping downwardly from the windshield to a rounded front end 14. Wrap around lights 15 at the corners of the front end merge into the side walls 11 and front end 12 and provide headlights, parking, turn signal, and corner illumination for the vehicle. In these streamlined vehicles, each side wall 11 has a well for the front steering wheel 16 and the overall contour is such that air will flow around and over the vehicle with the least resistance. As is customary, the windshield 13 slopes backwardly to a roof 17 which is also curved to lessen wind resistance. A rear window 18 slopes downwardly and rearwardly from the roof to the trunk deck 19.

The rear view mirror units 20,20 of this invention are mounted on the side walls 11,11 near the front end 14 of the automobile 12.

Figure 4:
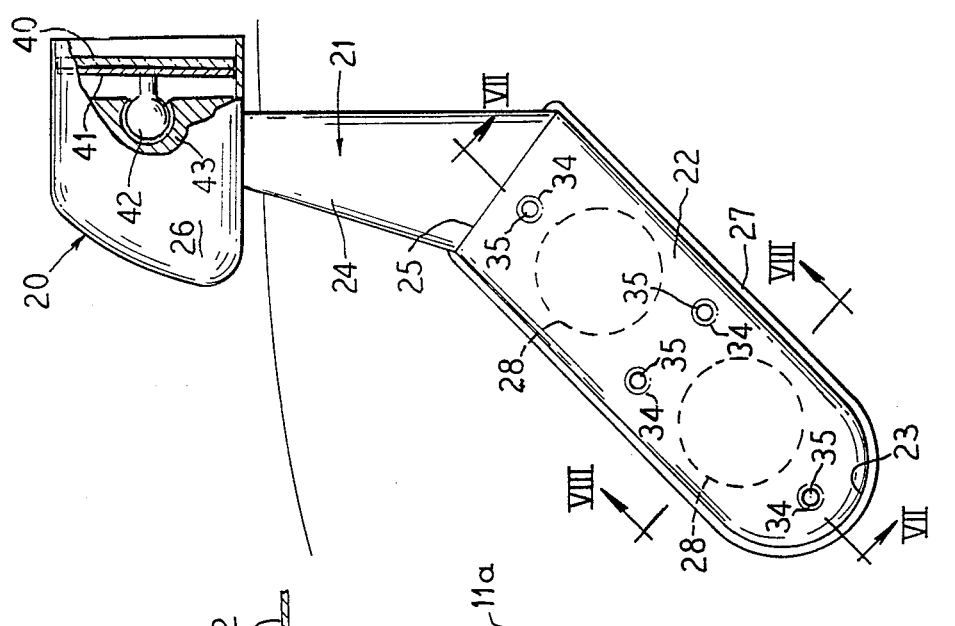
FIG. 4 is a sectional view along the line IV—IV of FIG. showing the front end view of the rear view mirror in elevation and the side wall of the automobile on which it is mounted is shown in cross section.
Figure 5:
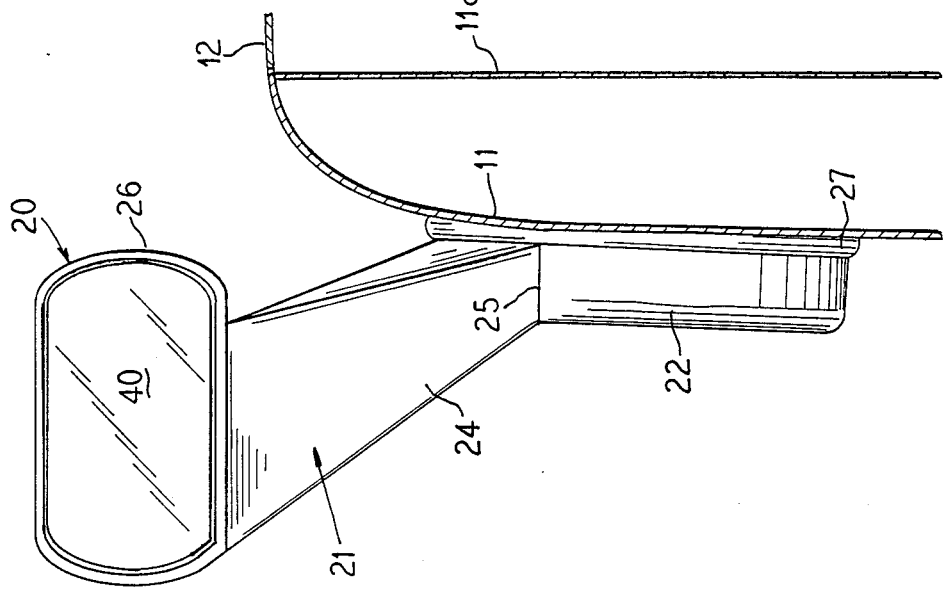
FIG. 5 is a sectional view along the line V—V of FIG. 1 and showing the rear end view of the mirror in elevation.
Figure 6:
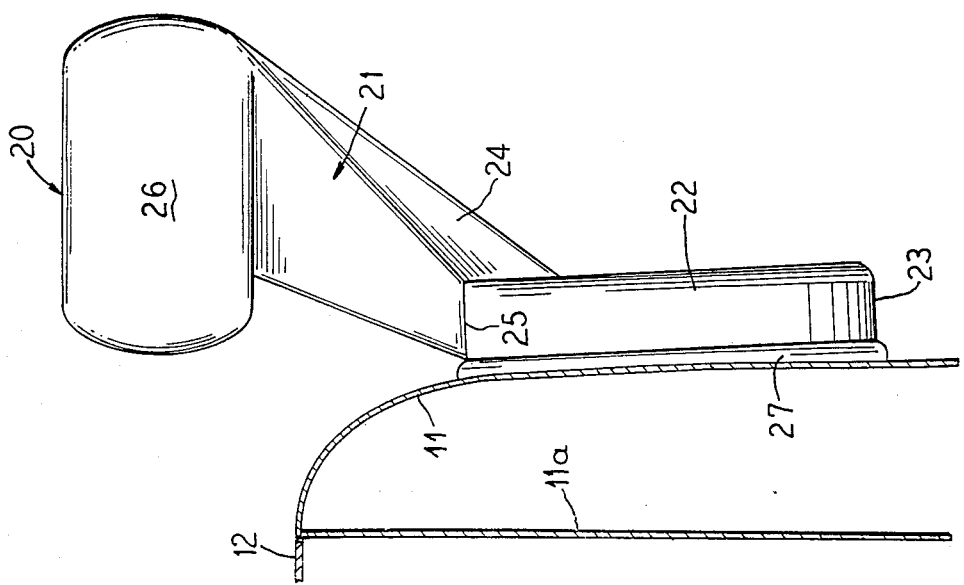
FIG. 6 is an outside face elevational view of the rear view mirror with a part broken away in vertical section.

As shown in FIGS. 4–6, these units 20 have a one piece casing 21 made of plastics material or metal and having a cup-like base 22 inclined upwardly and rearwardly on the side wall 11 with a rounded bottom end 23. A tubular neck 24 of oval cross section in a front to rear direction extends upwardly and outwardly from the top end 25 of the base 22 at an angle and converges to a smaller periphery at its upper end where it merges into a cup-shaped mirror frame 26. The open mouth of the cup base 22 opens to the side wall 11 and the rim of the mouth carries a resilient gasket 27 to be bottomed on the side wall for following its configuration without scratching or denting the side wall. As shown in FIG. 5, the gasket 27 surrounds the continuous annular rim of the base cup 22 and the bottom end of the neck 24 is narrower than the depth of the cup to provide the continuous periphery for receiving the gasket 27.

A pair of rubber suction cups 28,28 are mounted in side by side relation in the base cup 22. Each suction cup, as shown in FIGS. 7 and 8, has a resilient hemispherical body portion 29 with a projecting cylindrical stud 30 at its apex. The stud 30 mounts an internally threaded axial ferrule 31.

The outer wall of the base 22 has dimple 32 overlying the stud 30 of each suction cup 28 and apertures through the bottoms of these dimples receive bolts 33 which are threaded into the ferrules 31 and fixably secure the suction cups 28 to the base 22.

Additional dimples 34 are provided in the outer wall of the base 22 and have holes 35 through their bottoms. While four such dimples and holes are illustrated, it should be understood that a lesser number can be provided.

The rearwardly opening mouth of the top mirror casing or frame receives a rearview mirror 40 which can tilt in horizontal and vertical planes. The mirror mounting may be the same as provided for conventional rearview mirror casings and for purposes of illustration of a suitable mounting, the mirror 40 is mounted on a back plate 41 carrying a ball 42 tightly in a socket 43 carried by the inner wall of the frame casing 26. The arrangement is such that the mirror will tilt within the open mouth of the housing 26 and the tilting can be controlled manually by depressing the peripheral edges of the mirror causing it to assume and hold the desired angle for viewing. The conventional cables controlled by tiltable levers adjacent the driver's seat, electric motors and the like can be provided in the frame casing 26 to tilt the mirror.

In their free state, the mouths of the suction cups 29 project beyond the gasket 27.

To mount the casings of the rearview mirrors 20 on the side walls 11,11 of the automobile 10, the base frame 22 is positioned in the upwardly inclined front to rear relation to the side walls as illustrated in FIG. 6 at the most forward ends of these side walls where they will not interfere with the lights. The contour and height of the side walls of different automobiles will vary widely and may be curved from a flat side configuration. Since the mouths of the suction cups are resilient they will deform into conformity with the side wall contours against which they are pressed. The front to rear inclination of the base 22 on the side wall 22 provides for a substantial mounting area without requiring much vertical height so that low or narrow sidewalls can be accommodated.

To locate the best position for the rearview mirror on any particular vehicle, the suction cups are pressed at various locations on the vehicle side wall to find by trial and error, a position for the mirror 40 laterally outward from the side wall and above the hood 12. The suction cups thus provide an initial temporary but firm mounting to secure the casing on the side wall of the vehicle.

Figure 3:
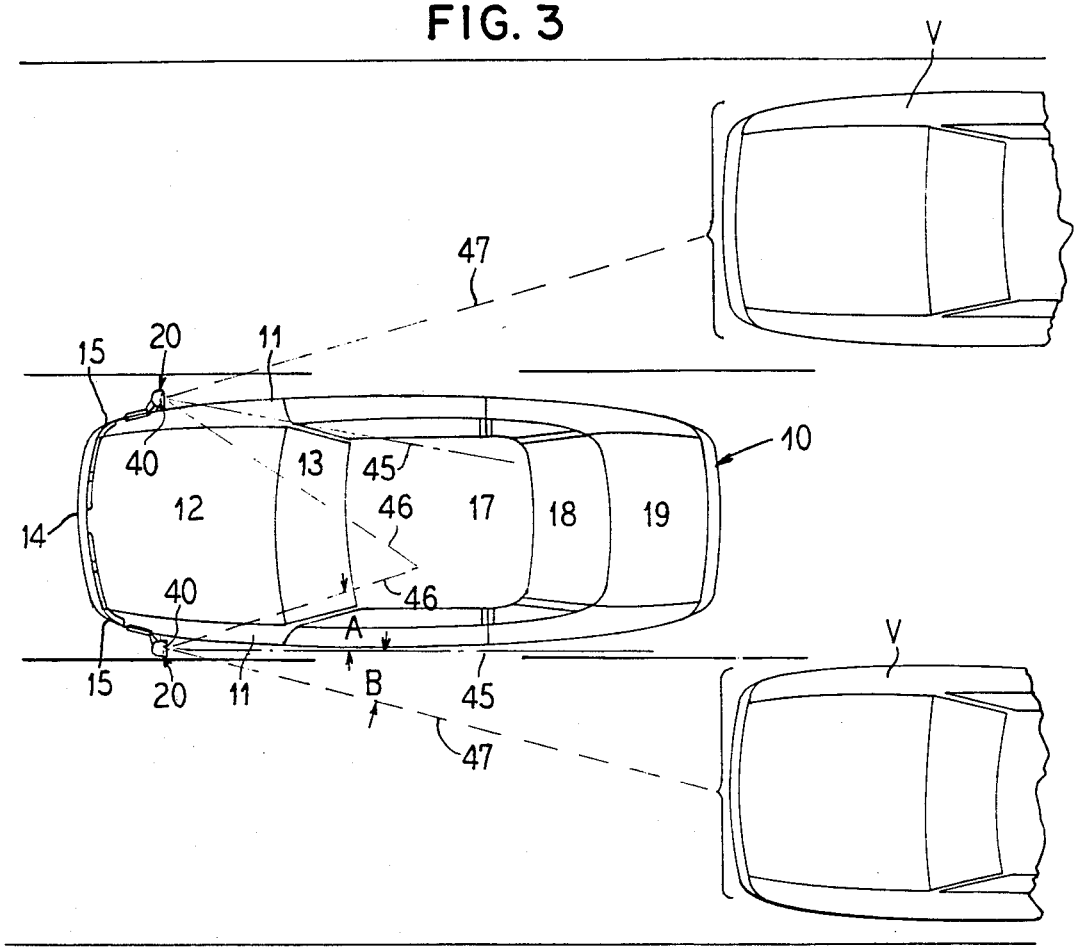
FIG. 3 is a top plan view of the vehicle of FIGS. 1 and 2 showing the vehicle in the center lane of a three lane highway and illustrating the manner in which approaching vehicles in the side lanes are fully visible to the driver even when they enter the conventional blind spots at the rear end of the vehicle.

The optimum position for the mirror assemblies 20 is, as illustrated in FIG. 3, such as to provide the longest possible distance from the eyes of the driver so that the angle of incidence along the sight line is as small as possible thereby providing a small angle of reflection.

As illustrated in FIG. 3, the line 45 extends normal to the plane of the mirror 40 and the mirror on the driver's side is tilted so that this line clears the side of the automobile close to the inside of the left-hand lane adjacent the driver's side of the vehicle at the rear of the vehicle. Once this line has been established, the long sight line 46 between the eyes of the driver and the mirror will have only a small angle A of incidence from the line 45 and this small angle of incidence produces a corresponding small angle of reflection B to the line 47 so that the viewing area is opened up the entire lane at the rear end of the automobile. The driver will have a full view of an approaching vehicle V in the lane whereas heretofore, the short distance between the driver's eyes and the rearview mirror at the windshield required a large angle of incidence and a corresponding large angle of reflection to block out a view of the approaching vehicle at the rear end of the automobile.

It will be understood that the mirror 40 on the passenger side of the vehicle will have a longer sight line 46 from the driver's eyes with even a lesser angle of incidence to open up even a greater rearview of the right-hand lane.

Once the optimum position for the assembly has been established on the side wall of the automobile, a drill is inserted through the holes 35 in the bottoms of the dimples 34 to pierce the outer side wall of the vehicle and self-tapping pointed screws 48 are inserted through the holes 35 and threaded into the sheet metal of the side wall 11 of the automobile drawing the cup-shaped base 22 toward the side wall and deforming the gasket 27 into sealed relation with the side wall. Of course, fasteners other than self-tapping screws, such as bolts extending through the side wall and even through any liner 11a of the vehicle inside the side wall 11 to receive nuts thereon or expansion bolts, can be used.

While a pair of suction cups 28 are shown in the cuplike base 22 of the unit 20, it should be understood that, in some installations, a single suction cup 28 will suffice to provide the initial mounting on the vehicle.

In a modified arrangement 50 of FIGS. 9 and 10, the suction cups 28 in the base 22 are replaced with a strip of magnetic tape 51 on a resilient cushion backing 52 secured to the base. The cushion 52 may be in the form of a rectangular block cemented or vulcanized to the inner face of the base. The free state condition of the backing 52 carries the tape to press against the side wall 11 so that when the base is pressed toward the side wall 11 of the vehicle, the tape will engage the face of the side wall and initially anchor the framework on the side wall for adjustment. Then the holes 35 through the base can receive fasteners for permanently attaching the assembly to the side wall.

From the above descriptions, it will therefore be understood that this invention provides rearview mirrors for aerodynamically streamlined vehicles to positions laterally of the front ends of the vehicles to establish rearview vision adjacent the rear end of the vehicle to avoid heretofore encountered blind spots of approaching vehicles in the lanes alongside the vehicle.

I claim as my invention:

1. A rearview mirror especially adapted for aerodynamically streamlined automobiles having side walls curved into the plane of a downwardly sloped hood at the front end of the vehicle which comprises a frame having a base, an upstanding neck, and a mirror housing with an open rear end on the top of the neck, a mirror tiltably mounted in the mouth of the open rear end of the mirror housing, means releasably mounting said base on the side wall of the automobile adjacent the front end thereof to selectively position the mirror housing above the hood and laterally outward from the side wall to establish an elongated sight line between the eyes of the driver and the mirror for reducing the angle of incidence and the angle of reflection to a minimum for avoiding blind spots alongside the rear end of the vehicle, and means for permanently mounting said base on said side wall at the selected position.

2. The mirror of claim 1 wherein the base is hollow and surrounds the means releasably mounting said base on said side wall.

3. The mirror of claim 2 wherein the means releasably mounting said base are selected from the class consisting of suction cups and magnets.

4. A rearview mirror accessory for aerodynamically streamlined vehicles with upstanding side walls curved at their front ends to blend with the hood of the vehicle which comprises a frame having a cup-shaped base, an upstanding neck, and a rearwardly opening cupshaped mirror housing, a mirror tiltably mounted in the mouth of the housing, means in the cup-shaped base for releasably mounting the base on the side wall adjacent the front end of the vehicle for trial and error selective positioning of the housing on the vehicle, a gasket between the mouth of the base and the side wall adapted to follow the contour of the side wall for sealing the base to the side wall, and fastener means carried by and projecting from the base to permanently attach the base to the side wall.

5. The accessory of claim 4, wherein the cup-shaped base has a suction cup mounted therein for temporarily attaching the housing to the side wall.

6. The accessory of claim 5 including a pair of suction cups in side-by-side relation in the base.

7. The accessory of claim 5 wherein the suction cup has a resilient deformable hemispherical portion with a stud at the apex secured to the base.

8. The accessory of claim 4, wherein the cup-shaped base has a magnet therein for temporarily attaching the base to the side wall.

9. The accessory of claim 8 wherein the magnet is flexible and is backed by a resilient cushion.

10. The accessory of claim 4 including dimples in the base receiving the fastener means.

* * * * *